May 13, 1969    M. L. BENJAMIN ET AL    3,443,819
DRILL CHUCK WITH COOLANT SUPPLY
Filed Dec. 22, 1966
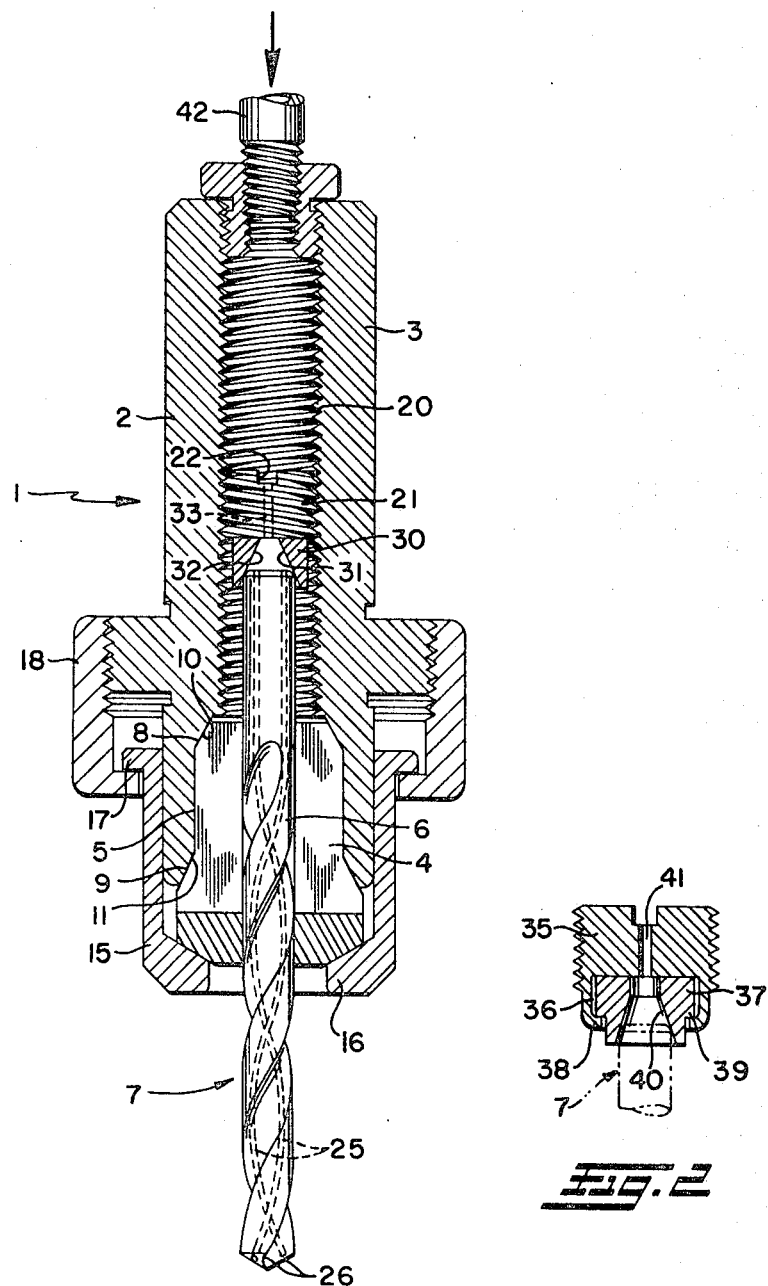
INVENTORS
MILTON L. BENJAMIN
DAVID D. WALKER
BY *Oberlin, Maky & Donnelly*
ATTORNEYS

United States Patent Office 3,443,819
Patented May 13, 1969

3,443,819
DRILL CHUCK WITH COOLANT SUPPLY
Milton L. Benjamin and David D. Walker, Chagrin Falls, Ohio, assignors to Erickson Tool Company, Solon, Ohio, a corporation of Ohio
Filed Dec. 22, 1966, Ser. No. 603,874
Int. Cl. B23b 31/00, 5/34, 5/22
U.S. Cl. 279—20               11 Claims

ABSTRACT OF THE DISCLOSURE

A chuck having a sliding connection between an adaptor and stop member for maintaining inner end of tool in seating engagement with adaptor despite slight axial misalignment between tool and stop member. An opening in adaptor of sufficient diameter to overlap a smaller opening in stop member for all adjusted positions of adaptor provides a continuous flow path for coolant into oil holes in the seated end of tool.

---

The present invention relates generally as indicated to a drill chuck with coolant supply and more particularly to a drill chuck having novel means for directing coolant to the flow passages in a drill or like tool gripped thereby.

Heretofore, it has been the usual practice to provide a central opening in an adjustable stop member for a chuck which communicates with oil holes in the shank of a drill through which coolant is supplied to the cutting edges for lubricating and cooling the cutting edges as well as aiding in chip removal. However, oftentimes the drill holes do not properly match the opening in the stop member, and there is substantial leakage of the coolant around the drill shank, whereby the coolant supplied to the point of the drill is substantially reduced.

Accordingly, it is a principal object of this invention to provide a chuck with novel means for directing substantially all of the coolant to the drill point through coolant passages therein despite slight axial misalignment of the drill and stop member coolant passages. These and other objects are accomplished by providing an adaptor between the stop member and tool shank having a tapered seat for receiving the shank end of the drill in fluid tight engagement therewith. The adaptor is held in sliding contact with the stop member and has an opening therethrough of a larger diameter than the stop member opening, whereby should there be any axial misalignment between the tool and stop member, the adaptor will be caused to move in a transverse direction to compensate for the misalignment and still supply the coolant to the passages provided therefor in the tool.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but a few of the various ways in which the principles of the invention may be employed.

In such annexed drawing:

FIG. 1 is a central longitudinal section through a chuck which includes a preferred form of stop member and adaptor constructed in accordance with this invention; and FIG. 2 is a longitudinal section through a modified form of stop member and adaptor.

Referring now in detail to the drawing and first especially to FIG. 1, there is shown a typical tool-supporting chuck 1 comprising a body member 2 having at one end a shank 3 which is adapted to be non-rotatably mounted in a spindle of a turret lathe or like metal working machine, not shown, and a collet 4 received in a counterbore 5 in the other end for tightly gripping the shank 6 of a drill or other such tool 7. The collet 4 may be of conventional type, axially slotted from opposite ends and having axially spaced parallel frusto-conical surfaces 8 and 9 which are adapted to be brought into engagement with corresponding frusto-conical seats 10 and 11 formed on the wall of the counterbore 5. A nosepiece 15 slidably received on the collet end of the body member 2 has an inturned flange 16 adjacent its outer end for engagement with the outer end of the collet 4, and an outturned shoulder 17 on its inner end which is engaged by a nut 18 threadedly engaging the body member 2 Accordingly, upon tightening of the nut 18, the nosepiece 15 is drawn inwardly to force the collet 4 against the frusto-conical seats 10 and 11, causing radial contraction of the collet 4 into tight gripping engagement with the tool shank 6.

Concentric with the counterbore 5 there is an internally threaded bore 20 in the body member 2 in which is threadedly received an adjustable stop member 21 for properly locating the inner end of the tool shank 6 within the chuck 1 and taking up axial thrust loads acting on the tool 7. The threads of the bore 20 are desirably lefthand threads, whereby increased torque loads on the tool will cause a corresponding increase in the frictional drive between the stop member 21 and tool shank 6, similar to the operation of the stop member 17 of Patent No. 2,778,651, granted to Milton and Stanley Benjamin on Jan. 22, 1957. A screwdriver slot 22 may be provided in the outer face of the stop member 21 to permit ready adjustment of the location of the stop member axially along the bore 20.

The tool 7 is provided with a pair of oil holes 25 which may run the full length of the tool as shown or alternatively, communicate with grooves formed in the drill lands for supplying a suitable coolant to the cutting edges 26. Such tools are used largely in screw machine and turret lathe production work where lubrication and cooling of the cutting edges are difficult.

Between the shank 6 of the tool 7 and stop member 21 there is a cylindrical adaptor member 30 having a frusto-conical opening 31 therethrough the wall of which provides a seat 32 for the shank 6 to establish a substantially fluid-tight seal therewith. The adaptor 30, rather than being rigidly connected to the stop member 21, however, is slidably secured thereto, thereby permitting limited movement of the adaptor 30 transversely of the stop member 21 to compensate for any axial misalignment that might be present between the shank 6 and stop member 21, thus assuring proper seating of the shank 6 within the frusto-conical opening 31 and communication of the central opening 33 in the stop member 21 with the tool oil holes 25 via the opening 31 in the adaptor 30 whose smallest diameter is sufficiently large to overlap the stop member opening 33 for all radially adjusted positions of the adaptor.

In the form shown in FIG. 1, such sliding connection between the stop member 21 and adapter 30 is provided by making both elements of a suitable magnetic material such as steel and magnetizing one or both to establish a magnetic attraction therebetween.

Alternatively, a stop member 35 may be provided with a recess 36 in one end of a larger diameter than the adaptor 37 for receipt therein and such end turned in at 38 to overlie a shoulder 39 of the adaptor 37 for retaining the adaptor 37 within the recess 36, thereby establishing a sliding connection between these two parts and fluid communication between the enlarged central opening 40 in the adaptor 37 and stop member opening 41 for all adjusted positions of the adaptor.

In operation, a suitable coolant is supplied to the bore 20 of the chuck 1 through a coupling 42 of conventional type threadedly connected to such bore and forced under high pressure through the communicating passage in the stop member 21, 35, adapator 30, 37 and tool 7 to the tool cutting edges 26 where it serves as a lubricant and coolant to reduce the temperature of the cutting edge and also assists in chip removal. Because of the sliding connection between the stop member and adaptor, one tool 7 may be replaced by another having a different oil hole spacing, and the axes of the tools may be out of alignment with the axis of the stop member and yet proper communication between the various coolant passages in the chuck and tool will be maintained for proper coolant flow to the cutting edges of the tool.

Other modes of applying the principles of the invention may be employed, change being made as regards the details described, provided the features stated in any of the following claims or the equivalent of such be employed.

We therefore particularly point out and distinctly claim as our invention:

1. A chuck comprising a body member, means contained within said body member for releasably gripping the shank of a tool, a stop member contained within said body member, and adaptor member contacting one side of said stop member and having a seat for engagement by the inner end of the tool to be held by said gripping means, said stop member and adaptor member being magnetically connected together to permit limited relative transverse sliding of said adaptor member to said stop member for maintaining the desired seating engagement between said adaptor member and tool despite slight axial misalignment between such tool and said stop member.

2. A chuck comprising a body member, means contained within said body member for releasably gripping the shank of a tool, a stop member contained within said body member, an adaptor member contacting one side of said stop member and having a seat for engagement by the inner end of the tool to be held by said gripping means, said stop member having a recess in one end of a larger diameter than said adaptor member for receipt of said adaptor member therein, and said one end being turned inwardly to overlie a shoulder on said adaptor member for retaining said adaptor member within said recess while permitting limited transverse movement of said adaptor member with respect to said stop member for maintaining the desired seating engagement between said adaptor member and tool despite slight axial misalignment between such tool and said stop member.

3. A chuck comprising a body member, means contained within said body member for releasably gripping the shank of a tool, a stop member contained within said body member, an adaptor member contacting one side of said stop member and having a seat for engagement by the inner end of the tool to be held by said gripping means, and means mounting said adaptor member for limited transverse movement with respect to said stop member for maintaining the desired seating engagement between said adaptor member and tool despite slight axial misalignment between such tool and said stop member, both said stop member and adaptor member having openings therethrough, said opening in said adaptor member being in fluid communication with said seat and of sufficient diameter to overlie said stop member opening in all transverse positions of said adaptor member for flow of coolant and the like to oil holes in the seated end of such tool.

4. The chuck of claim 3 wherein said opening in said adaptor member is frusto-conical to provide said seat for the tool.

5. In combination, a cutting tool having a shank, and a chuck for gripping said shank, said chuck having a stop member therein, an adaptor, said adaptor having a seat for receipt of the inner end of said tool therein, and means mounting said adaptor for relative sliding movement on said stop member in a direction transverse to the longitudinal axis thereof, whereby proper seating engagement between said tool and adaptor is maintained despite axial misalignment between said stop member and tool, said tool having oil holes in said inner end, said adaptor having a central opening communicating with said oil holes, and said stop member having an opening therein through which coolant may be supplied, said opening in said adaptor being of sufficient diameter to overlap said stop member opening in all positions of said adaptor to permit passage of the coolant through said openings into said oil holes.

6. The combination of claim 5 wherein said seat forms a fluid-tight seal with said tool to preclude coolant which enters said adaptor from leaking around the shank of said tool.

7. The combination of claim 5 wherein said tool is a drill and said stop member is in threaded engagement with said chuck to provide adjustment of said stop member and adaptor connected thereto.

8. The combination of claim 5 wherein said stop member and adaptor are magnetically connected together to permit sliding movement of said adaptor on said stop member.

9. The combination of claim 5 wherein said stop member has a recess in one end of a larger diameter than said adaptor for receipt of said adaptor therein, said one end being turned inwardly to overlie a shoulder on said adaptor for retaining said adaptor within said recess.

10. In combination, a cutting tool having a shank, and a chuck for gripping said shank, said chuck having a stop member therein, and an adaptor, said adaptor having a seat for receipt of the inner end of said tool therein, said stop member and adaptor being magnetically connected together to permit relative sliding movement of said adaptor on said stop member in a direction transverse to the longitudinal axis thereof.

11. In combination, a cutting tool having a shank, and a chuck for gripping said shank, said chuck having a stop member therein, and an adaptor, said adaptor having a seat for receipt of the inner end of said tool therein, and said stop member having a recess in one end of a larger diameter than said adaptor for receipt of said adaptor therein, said one end being turned inwardly to overlie a shoulder on said adaptor for retaining said adaptor within said recess while permitting relative sliding movement of said adaptor with respect to said stop member in a direction transverse to the longitudinal axis thereof.

References Cited

UNITED STATES PATENTS 1,953,830    4/1934    Park _____ 279—22

FOREIGN PATENTS 379,670    4/1940    Italy.

LESTER M. SWINGLE, *Primary Examiner.*

D. R. MELTON, *Assistant Examiner.*

U.S. Cl. X.R.

279—1